US012335162B2

(12) United States Patent
Ma et al.

(10) Patent No.: US 12,335,162 B2
(45) Date of Patent: Jun. 17, 2025

(54) HARDWARE-IMPLEMENTED TABLES AND METHODS OF USING THE SAME FOR CLASSIFICATION AND COLLISION RESOLUTION OF DATA PACKETS

(71) Applicant: GREATER SHINE LIMITED, New Taipei (TW)

(72) Inventors: Tianan Tim Ma, Palo Alto, CA (US); Hong Kui Yang, Palo Alto, CA (US); Su-Lin Low, Palo Alto, CA (US); Hausting Hong, Palo Alto, CA (US)

(73) Assignee: GREATER SHINE LIMITED, New Taipei (TW)

( * ) Notice: Subject to any disclaimer, the term of this patent is extended or adjusted under 35 U.S.C. 154(b) by 357 days.

(21) Appl. No.: 17/817,881

(22) Filed: Aug. 5, 2022

(65) Prior Publication Data

US 2022/0385593 A1 Dec. 1, 2022

Related U.S. Application Data

(63) Continuation of application No. PCT/US2021/014945, filed on Jan. 25, 2021.
(Continued)

(51) Int. Cl.
*H04L 47/62* (2022.01)
*H04L 1/00* (2006.01)
*H04L 47/2425* (2022.01)

(52) U.S. Cl.
CPC ........ *H04L 47/6215* (2013.01); *H04L 1/0045* (2013.01); *H04L 47/2433* (2013.01)

(58) Field of Classification Search
CPC .............. H04L 47/6215; H04L 1/0045; H04L 47/2433
See application file for complete search history.

(56) References Cited

U.S. PATENT DOCUMENTS 6,226,629 B1   5/2001  Cossock
6,754,662 B1 *  6/2004  Li ........................... H04L 45/60
                                                      707/693
(Continued)

FOREIGN PATENT DOCUMENTS

CN        1534942 A    10/2004
CN      107911315 A     4/2018
(Continued)

OTHER PUBLICATIONS

International Search Report and Written Opinion for PCT/US2021/014945, mailed Apr. 13, 2021 (10 pages).
(Continued)

*Primary Examiner* — Michael Thier
*Assistant Examiner* — Tracy Lauren Colbert
(74) *Attorney, Agent, or Firm* — PERKINS COIE LLP

(57) ABSTRACT

Introduced here are approaches to classifying traffic that comprises data packets. For each data packet, a classification engine implemented on a computing device can identify an appropriate class from amongst multiple classes using a lookup table implemented in a memory. The memory could be, for example, static random-access memory (SRAM) as further discussed below. Moreover, the classification engine may associate an identifier with each data packet that specifies the class into which the data packet has been assigned. For example, each data packet could have an identifier appended thereto (e.g., in the form of metadata). Then, the data packets can be placed into queues based on the identifiers. Each queue may be associated with a different identifier (and thus a different class).

19 Claims, 7 Drawing Sheets

Related U.S. Application Data

(60) Provisional application No. 62/972,757, filed on Feb. 11, 2020.

(56) References Cited

U.S. PATENT DOCUMENTS

| | | | |
|---|---|---|---|
| 10,103,992 B1* | 10/2018 | Bshara | H04L 47/125 |
| 2003/0135603 A1 | 7/2003 | Lin | |
| 2005/0078601 A1 | 4/2005 | Moll et al. | |
| 2008/0049752 A1* | 2/2008 | Grant | H04L 45/00 |
| | | | 370/392 |
| 2009/0274154 A1* | 11/2009 | Kopelman | H04L 49/3009 |
| | | | 370/395.32 |
| 2010/0023726 A1* | 1/2010 | Aviles | H04L 67/1097 |
| | | | 711/216 |
| 2010/0161787 A1* | 6/2010 | Jones | G06F 11/3476 |
| | | | 709/224 |
| 2010/0284300 A1* | 11/2010 | Deshpande | H04L 43/026 |
| | | | 370/253 |
| 2010/0287227 A1* | 11/2010 | Goel | H04L 67/56 |
| | | | 709/202 |
| 2011/0219010 A1* | 9/2011 | Lim | G06F 16/00 |
| | | | 707/E17.014 |
| 2011/0225372 A1 | 9/2011 | Pirog | |
| 2013/0007008 A1 | 1/2013 | Yuan et al. | |
| 2014/0075539 A1 | 3/2014 | Zuk et al. | |
| 2015/0172143 A1 | 6/2015 | Degioanni et al. | |
| 2016/0135074 A1* | 5/2016 | Welin | H04W 28/10 |
| | | | 370/235 |
| 2016/0197831 A1 | 7/2016 | De Foy et al. | |
| 2016/0269290 A1* | 9/2016 | Chu | H04L 45/748 |
| 2018/0246717 A1* | 8/2018 | Martin | H04L 9/0643 |
| 2018/0368047 A1* | 12/2018 | Patil | H04L 45/245 |
| 2021/0399820 A1* | 12/2021 | Hoptroff | H04W 12/61 |

FOREIGN PATENT DOCUMENTS

| | | | | |
|---|---|---|---|---|
| CN | 109754021 A | | 5/2019 | |
| CN | 110414928 A | | 11/2019 | |
| WO | WO-2019164827 A1 * | | 8/2019 | G06F 13/28 |

OTHER PUBLICATIONS

Yin Ke, Deng Yaping, Tang Hong, Multidimensional IP Packet Classification Algorithm Based on Hash_tree; Computer Engineering and Application, No. 32, Aug. 1, 2007. (10 pages with English translation).

The first office action issued in corresponding CN application No. 202180014204.9 dated May 13, 2023. (18 pages with English translation).

* cited by examiner

HARDWARE-IMPLEMENTED TABLES AND METHODS OF USING THE SAME FOR CLASSIFICATION AND COLLISION RESOLUTION OF DATA PACKETS

CROSS-REFERENCE TO RELATED APPLICATIONS

This application is a continuation of International Application No. PCT/US2021/014945, filed on Jan. 25, 2021, which claims priority to U.S. Provisional Application No. 62/972,757, titled "Method and Apparatus of 4G/5G Multi-Mode MAC Data Plane QoS Classification Using Hardware Hash Tables with Auto Cache and Re-Hash" and filed on Feb. 11, 2020, which applications are incorporated herein by reference in their entirety.

TECHNICAL FIELD

Various embodiments concern approaches to classifying the data packets included in traffic flows.

BACKGROUND

Bandwidth is normally limited in telecommunications systems that are designed in accordance with 4G and 5G wireless communication standards. Oftentimes, different flows of traffic will have to compete for bandwidth. These traffic flows may originate from different computer programs and/or computing devices. As an example, a telecommunications system may receive traffic flows from various computing devices (e.g., mobile phones and personal computers) connected thereto.

Traffic flows can be sorted into categories (also referred to as "classes") according to various parameters so as to enable data packets to be serviced differently. This process is referred to as "traffic classification," and it tends to be performed within the data plane of a protocol stack. Traffic classification enables the data packets in each class to be treated differently, for example, by differentiating the network services (or simply "services") that are appropriate. For instance, data packets deemed to be high priority (and thus sorted into a given class) may be allocated greater bandwidth by a telecommunications system.

Figure 1:
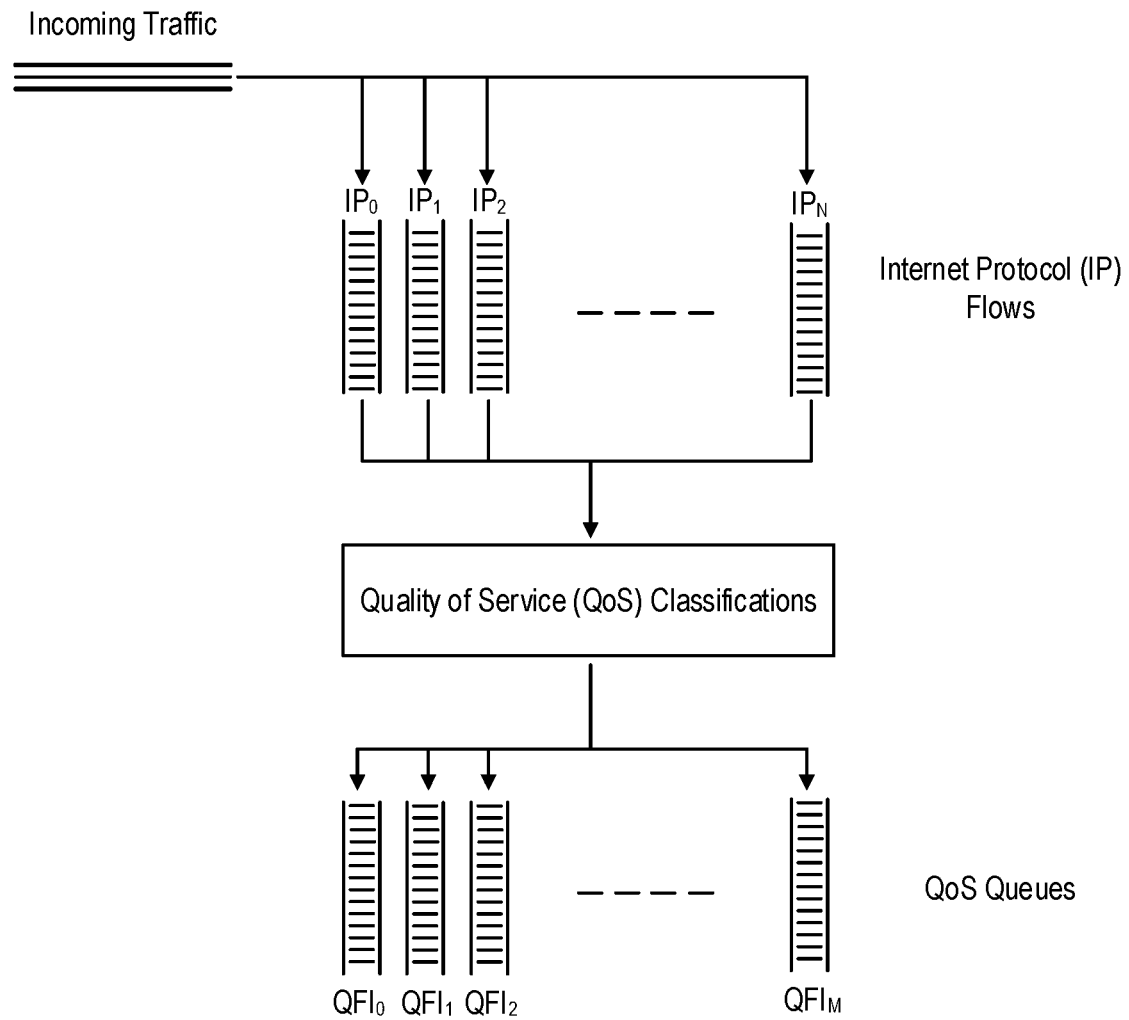
FIG. 1 includes a high-level illustration that depicts how incoming traffic (e.g., from a higher layer in a protocol stack) can be sorted into traffic flows based on the attributes of the individual data packets.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Traffic classification has historically been important to providing differentiation in services. Traffic classification requires that each data packet in the traffic received by a telecommunications system be examined, however. Normally, for each data packet, the telecommunications system sequentially executes a series of software-defined rules whose outputs establish the appropriate course of action. But this approach can be burdensome and, in some situations, logistically and computationally impractical. For example, traffic classification that relies on software-defined rules can be difficult, if not impossible, to perform in a timely manner when throughput is high. These situations are becoming increasingly common as an ever-increasing number of computing devices are able to connect to networks.

Introduced here are hardware-implemented approaches to classifying traffic that comprises data packets. For each data packet, a classification engine implemented on a computing device can identify an appropriate class from amongst multiple classes using a lookup table (or simply "table") implemented in a memory. The memory could be, for example, static random-access memory (SRAM) as further discussed below. Moreover, the classification engine may associate an identifier with each data packet that specifies the class into which the data packet has been assigned. For example, each data packet could have an identifier appended thereto (e.g., in the form of metadata). Then, the data packets can be placed into queues based on the identifiers. Each queue may be associated with a different identifier (and thus a different class).

FIG. 1 includes a high-level illustration that depicts how incoming traffic (e.g., from a higher layer in a protocol stack) can be sorted into traffic flows based on the attributes of the individual data packets. These attributes collectively define the "identity" or "fingerprint" of each data packet, and therefore can be used to determine whether a given data packet is unique or similar to other data packets. As further discussed below, each traffic flow may be associated with a different set of one or more attributes. Examples of attributes include Internet Protocol (IP) source address, IP destination address, source port, destination port, protocol type, and class of service. Here, for example, the traffic flows are representative of IP flows, and each IP flow (e.g., $IP_0$, $IP_1$, $IP_2, \ldots, IP_N$) is associated with a different IP source address.

These traffic flows can then be subjected to a classification process in which quality of service (QoS) classifications are applied so as to assign classification information (also referred to as "mapping information") to each data packet in each traffic flow. Normally, the classification information takes the form of an identifier indicative of the queue or class to which each data packet is assigned. These identifiers may be referred to as "QoS flow identifiers" (QFIs) or "QoS class identifiers" (QCIs) as each identifier indicates the flow or class of which the corresponding data packet is a part. In FIG. 1, there are M queues—each of which corresponds to a single identifier and a single class—into which the data packets in N traffic flows can be assigned. As further discussed below, such an approach enables services and resources to be differentiated across the queues. For example, in embodiments where the queues correspond to different levels of priority, a computing device can readily identify those data packets that are most important during periods of high congestion.

There are several notable benefits to employing the approaches described herein. These benefits include (i) lower power consumption as collisions between data packets are rare, (ii) lower cost due to reduced memory usage, and (iii) greater processing speed as classification relies on hardware rather than purely software. These benefits may be particularly useful to portable computing devices (also referred to as "mobile computing devices") such as mobile phones, routers, and the like. For example, the classification scheme may be used in high-performance, low-cost, and/or low-power modems designed for 4G/5G network technologies (also referred to as "4G modems" or "5G modems").

Embodiments may be described with reference to particular computing devices, attributes of data packets, hash functions, etc. However, those skilled in the art will recognize that these features are similarly applicable to other computing devices, attributes of data packets, hash functions, etc. For example, while embodiments may be described in the context of employing a cyclic redundancy check (CRC) as a hash function, features of these embodiments could be extended to other types of hash functions.

Aspects of the technology can be embodied using hardware, firmware, software, or any combination thereof. Accordingly, embodiments may include a machine-readable medium with instructions that, when executed, cause a computing device to perform a process in which a classification engine employs a table programmed in memory to achieve high-speed classification of traffic handled by, for example, the media access control (MAC) sublayer of the protocol stacks developed for Long Term Evolution (LTE) and 4G/5G.

Terminology

References in this description to "an embodiment," "one embodiment," and "some embodiments" means that the feature, function, structure, or characteristic being described is included in at least one embodiment. Occurrences of such phrases do not necessarily refer to the same embodiments, nor are they necessarily referring to alternative embodiments that are mutually exclusive of one another.

Unless the context clearly requires otherwise, the words "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," or any variant thereof is intended to include any connection or coupling between two or more elements, either direct or indirect. The connection/coupling can be physical, logical, or a combination thereof. For example, objects may be electrically or communicatively coupled to one another despite not sharing a physical connection.

When used in reference to a list of multiple items, the word "or" is intended to cover all of the following interpretations: any of the items in the list, all of the items in the list, and any combination of items in the list.

The sequences of steps performed in the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview of Classification and Resolution Schemes

Introduced here is an approach to classifying traffic using a classification engine that is at least partially implemented via hardware. As further discussed below, the classification engine can be configured to apply a hash function to each data packet and then determine, based on the resulting hash codes, the appropriate classes for those data packets. For each data packet, the classification engine can compare the resulting hash code to a lookup table (or simply "table") whose entries associate hash codes with classification information (e.g., in the form of identifiers, such as QFIs or QCIs). Using the table, the classification engine can sort data packets at high speed. For context, a software-implemented approach would require that a linear search of entries be performed, and for each search, the software would need to compare more than 100 bits of information. When the number of entries is large (e.g., greater than 1,000), the software-implemented approach will take at least several thousand cycles (and thus will be unacceptable slow). Since the table described herein is implemented in memory, the proposed approach may only need several dozen cycles at most. As such, the proposed approach can save processing delay, buffer space, and power in comparison to conventional approaches that rely completely on software-defined rules for classification.

This approach may support multiple modes of operation. For example, the classification engine supports direct index lookup in some embodiments. Assume that incoming data packets have a Differentiated Services Code Point (DSCP) field or Type of Service (TOS) field included in the header. In such a scenario, the classification engine may permit classification based on direct mapping of DSCP/TOS values to classification information. Additionally or alternatively, the classification engine may permit classification based on identifiers (e.g., QFIs or QCIs). In such embodiments, each queue into which data packets can be assigned could be associated with an identifier having a certain bit width. In 5G New Radio (NR), for example, each identifier may be a 6-bit value.

In some embodiments, the identifier is representative of, or derived from, a hash code generated by a hash function that is designed to produce the hash code given one or more parameters as input. The term "hash function," as used herein, refers to any function that can be used to map data of arbitrary size to fixed-size values. For example, the hash function employed by the classification engine may be an n-tuple hash function that generates an identifier given n parameters of a given data packet as input. Generally, these parameters are determined based on analysis of the header of each data packet, though the parameters could be determined based on analysis of the payload, trailer, or other information (e.g., accompanying metadata).

To further increase the speed of classification, the classification engine can cache recent searches and then use those searches directly. This feature is referred to as "recent lookup caching." This cache of searches can be automatically updated over time to include the most recent searches performed by the classification engine. Moreover, to facilitate resolution of collisions between data packets, the classification engine can cache collision results in order to avoid going through collision resolution every time that a collision occurs. As further discussed below, the collision results may be stored in another memory that is distinct from the memory in which the table is stored. For example, the collision results and table may be stored in separate SRAMs.

Figure 2:
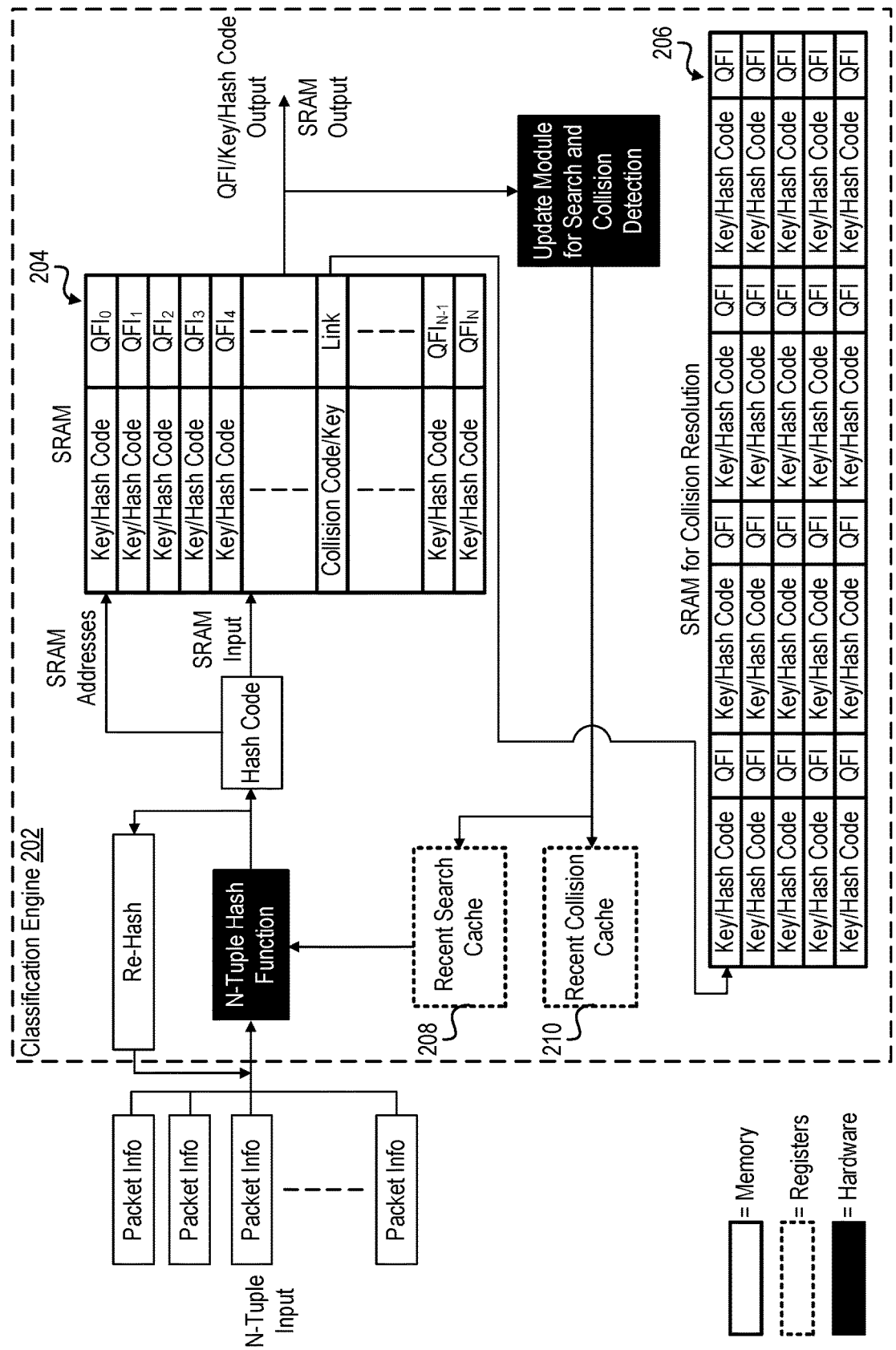
FIG. 2 includes a high-level block diagram that illustrates how traffic can be classified by a classification engine using a lookup table implemented in memory.

FIG. 2 includes a high-level block diagram that illustrates how traffic can be classified by a classification engine 202 using a lookup table 204 (or simply "table") implemented in memory. Here, for example, the table 204 is implemented in the SRAM of a computing device. Note that the term "classification engine," as used herein, may refer to a processing component that is able to employ (i) a hash function to generate hash codes and (ii) a decoder to search data using the hash codes. The processing component may be, for example, part of a logic circuit that is implemented on an integrated circuit. As further discussed below, the integrated circuit may include SRAM(s), register(s), and the like.

To classify a data packet, the classification engine 202 can initially obtain n pieces of information that are related to the data packet. Generally, these pieces of information are determined based on analysis of the header of the data packet. For example, the classification engine 202 may examine the header to determine and/or extract the pieces of information. However, the pieces of information could also be determined and/or extracted from the payload, trailer, or other information (e.g., accompanying metadata). For convenience, these pieces of information may be referred to as the "parameters" of the data packet. Examples of parameters include the IP source address, IP destination address, source port, destination port, protocol type, and class of service. Taken together, the parameters represent an n-tuple input that can be used by the classification engine 204 for classification.

As shown in FIG. 2, the classification engine 202 can then apply a hash function to the n-tuple input to generate a unique hash code for the data packet. Moreover, the classification engine 202 can use the hash code to form an index to find a memory address indicative of an entry in the table 204 where information relevant to classification of the data packet is stored. In the table 204, hash codes corresponding to n-tuple inputs can be uniquely mapped to classification information (here, in the form of OFIs). Thus, each hash code that is generated for an n-tuple input may be associated with a unique identifier in the table 204. Alternatively, the keys themselves may be uniquely mapped to classification information, though that generally requires more storage space. The term "key," as used herein, refers to the n-tuple input itself (i.e., the collection of n parameters).

The speed with which the table 204 can be searched by the classification engine 202 depends on the speed with which the hash function can be applied and the speed of memory access. Accordingly, memory located on the same chip as the classification engine 202 may be used to store the hash codes and corresponding classification information since the access time is one clock cycle. An example of on-chip memory is SRAM. Meanwhile, the speed of the hashing operation will depend on the complexity of the hash function and the length of the n-tuple input. The term "length," in this context, refers to the number of parameters included in the n-tuple input. Simple hash functions (e.g., a tabulation hash that can be calculated in a single cycle) can be applied to inputs having short tuple lengths in as little as one clock cycle. More complex hash functions may take longer to complete. For example, cyclic redundancy checks (CRCs) may need four cycles to hash 12 bytes (B) of tuple information similar to a tabulation hash function. Further information regarding designs of hash functions that can be employed by the classification engine 202 is below.

Two different n-tuple inputs may be mapped to the same entry in the table 204 in some situations. This event is referred to as a "collision." To resolve the collision (and thus uniquely map each of the n-tuple inputs), a separate record can be created to store the classification information for the colliding n-tuple inputs. For example, for each n-tuple input, the corresponding hash code and identifier (e.g., QFI or QCI) may be stored in an entry in a data structure 206 that is implemented in memory. As shown in FIG. 2, the data structure 206 may be stored in SRAM. This SRAM may be located on the same integrated circuit (also referred to as a "chip") as the SRAM in which the table 204 is stored.

While rare, collisions could occur multiple times. To effectively sort and search through all entries in the data structure 206, multiple parallel records may be allocated at one time for searching. Here, for example, four parallel records are simultaneously allocated so that four collisions can be searched in a single memory access (i.e., one cycle). Collectively, these four parallel records represent a "linear record" maintained in the data structure 206. Four collisions are normally enough for an input sample size of less than 1,024 entries in the table 204, though other embodiments may simultaneously allocate more or less than four records for searching.

Another way to resolve collisions is by re-hashing the n-tuple input. When a collision is detected, the classification engine 202 can increment the last byte of the conflicting n-tuple input by one. As mentioned above, a collision occurs when a given n-tuple input matches the same entry in the table 204 as another n-tuple input previously handled by the classification engine. The term "conflicting n-tuple input," as used herein, may refer to the more recent of the two n-tuple inputs involved in the collision. Thereafter, the classification engine 202 can apply the same hash function to the incremented n-tuple input. This process can be repeated until the collision no longer exists. This approach may be suitable for fast hash functions (e.g., those employed in tabulation hashing) that can be applied in one clock cycle.

To speed up the search process and collision resolution process, relevant information can be cached in one or more storage spaces. These storage spaces can be any region of physical memory storage in which data can be temporarily stored. Here, for example, information regarding recent searches is cached in a first register 208. This cache can be automatically updated as more searches are performed. For example, the first register 208 may be automatically updated so that it includes the most recent and/or most frequent searches of the table 204 that are performed by the classification engine 202. A separate cache for storing information regarding recent collisions can be maintained in a second register 210. Searches involving collisions (referred to as "collision searches") may be separately stored and cached because those searches are more static than non-collision searches. Since collision searches occur less frequently than non-collision searches, collision searches can be stored separately so that the second register 210 does not need to be purged or overwritten as frequently as the first register 210.

For each data packet to be classified, the classification engine 202 can obtain the n-tuple input and then check the cache in the first register 208. If a search involving the n-tuple input is found in the first register 208, then results for the search can be immediately retrieved from the cache in the first register 208. Similarly, the classification engine 202 may check the cache in the second register 210 after obtaining the n-tuple input. If information regarding a collision involving the n-tuple input is found in the second register 210, then information regarding how the collision was resolved can be immediately retrieved from the cache in the second register 210. Such an approach not only results in increased speed in classification, but also may result in less power being consumed if searches repeat themselves frequently. In that case, the classification engine 202 can simply retrieve classification information from the appropriate cache as discussed above rather than complete the entire search once again.

Figure 3:
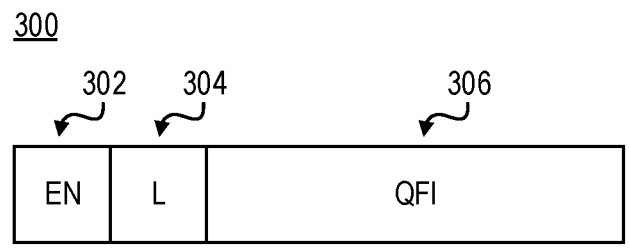
FIG. 3 illustrates how a field with classification information stored therein can be formatted.

As shown in FIG. 2, the table 204 and data structure 206 include fields in which classification information (here, in the form of QFIs) is stored. FIG. 3 illustrates how a field 300 with classification information stored therein can be formatted. The field 300 may include a first field 302, a second field 304, and a third field 306. Generally the first field 302 comprises one bit, the second field 304 comprises one bit, and the third field 306 comprises multiple bits. For example, the third field 306 may comprise six bits if intended to store QFIs.

The first field 302 (also referred to as the "EN field") indicates whether classification information has been validly programmed in the third field 306. A value of one in the first field 302 indicates that the third field 306 has been validly programmed, while another value (e.g., zero) indicates that the third field 306 has either not been programmed at all or has not been programmed with valid classification information.

The second field 304 (also referred to as the "L field") indicates whether the third field 306 includes a link pointer (e.g., a 24-bit link pointer) pointing to some other storage space. For example, a value of one in the second field 302 may indicate that the third field 306 includes a link pointer that points to a remote expansion buffer. The link pointer may be 16-bit aligned where the last four bits in the memory address are zeros. The link pointer can be used to expand the table 204 and/or data structure 206 into a dynamically allocated buffer. For example, one or more entries in the data structure 206 may include a link pointer to a dynamically allocated buffer if the classification engine 206 discovers that available capacity of the data structure 206 falls below a threshold due to high numbers of collisions.

The third field 306 (also referred to as the "identifier field," "QFI field," or "QCI field") includes classification information for the corresponding hash code. Assume, for example, that a classification engine is designed to use QFIs for classification purposes. When there is no collision, the QFI is the classification information that corresponds to the hash code generated for the n-tuple input. However, when there is a collision, the third field 306 may indicate the index of the linear record in a data structure (e.g., data structure 206 of FIG. 2) that stores information necessary for collision resolution. A single linear record may include information regarding multiple collisions. For example, a single linear record may be able to save information related to four different collisions as discussed above.

Figure 4:
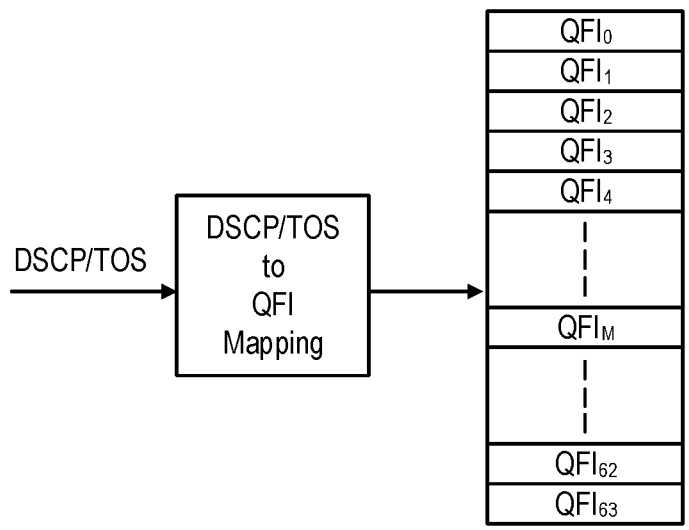
FIG. 4 illustrates how a given parameter can be mapped directly to classification information.

A classification engine may support a direct indexing approach instead of, or in addition to, the identifier-based approach described above. Rather than generate hash codes using a hash function, the classification engine can instead use part of the n-tuple input to directly map to classification information. Assume, for example, that one parameter of the n-tuple input is the 6-bit DSCP field extracted from the header of the corresponding data packet. In direct indexing mode (also referred to as "direct mapping mode"), the 6-bit DSCP field can be used as the last 6 bits of the hash code and, in turn, to form the memory address for the entry in the table (e.g., table 204 of FIG. 2) that includes classification information. Such an approach allows data packets to be mapped directly to identifiers (e.g., QFIs or QCIs) using a single parameter or a combination of multiple parameters without running any hash operation. FIG. 4 illustrates how a given parameter can be mapped directly to classification information. In FIG. 4, values for DSCP and TOS fields are mapped directly to QFIs that correspond to different queues (and thus different classes). However, those skilled in the art will recognize that other combinations of parameters and forms of classification information could be mapped to one another.

Approaches to Designing Hash Functions

The choice of hash function to be applied by the classification engine can be based on the desired speed, complexity, cost, or power consumption, as well as the quality of the hash randomness. One choice is the 24-bit CRC that is presently used in the code block in the media access control (MAC) layer for 5G NR. For 24-bit CRC, the size of the hash code is 24 bits (i.e., 3B), which generally provides sufficient uniqueness and randomness to largely avoid collisions. For a 12B 5-tuple search, 24-bit CRC could take 3-4 clock cycles depending on the hardware used for implementation. As discussed above, the hash code can be used to form an index to a table in SRAM that includes classification information, for example, by taking the 10 least significant bits (LSBs) as the memory address. Meanwhile, the relevant classification information can be stored in the location specified by the index.

In a normal scenario where there is no collision, the classification information can be retrieved in one memory read operation (e.g., one cycle for SRAM). Thus, the total delay may be only 4-5 clock cycles. To detect and then resolve collisions, the original n-tuple input or a corresponding hash code may need to be stored in the SRAM together with the appropriate identifier (e.g., QCI for LTE, QFI for 4G/5G). For each search operation, when the n-tuple input is less than 24 bits—the size of the hash code of a 24-bit CRC—the n-tuple input can be stored in the memory location to check for collisions. If the n-tuple input is more than 24 bits—as is usually the case—then the 24-bit hash code can be stored in the memory location instead of the n-tuple input. For example, if all n-tuple inputs are 12B, then instead of storing all 12B of those inputs, only 3B may be stored. Accordingly, a significant amount of memory can be saved even if the table has to be very large (e.g., due to the number of unique hash codes).

As an example, assume that a classification engine has been tasked with classifying 64 unique traffic flows. This means that from the traffic directed to the computing device of which the classification engine is a part, there are a maximum of 64 different flows. To uniquely generate an index to a memory address for each traffic flow, the index space would likely need to be at least 1,024 entries according to the Birthday Theorem. Accordingly, the index size indicating memory location should be roughly 10 bits. A single entry in the table in the SRAM would be 4B (i.e., 3B+1 B), while the total size of the SRAM would be 4 kilobytes (KB) for 10-bit memory addresses. The memory addresses can be mapped from the hash codes. One simple way to accomplish the mapping would be to take the least or most significant 10 bits of each hash code as the corresponding memory address.

When collisions occur that cannot be resolved by re-hashing, collided keys or hash codes can be stored in a linear memory space for searching. If there are fewer than 64 traffic flows, then the collision rate should be low given the size of the index space. Assuming that (i) each unique traffic flow over 64 produces a single conflict and (ii) N is the total number of unique traffic flows, then the size of the linear memory space can be N minus 64. For example, if the total number of traffic flows is 128, then 64 additional entries can be added as linear memory space for storage of collided keys or hash codes.

The linear memory space is organized into a 16B record in some embodiments. The 16B record is enough to contain four sets of 24-bit hash codes and the corresponding classification information (e.g., QFIs or QCIs). This memory configuration allows four hash codes (and the corresponding classification information) to be read with a single memory read operation and, as such, is effectively four times faster than normal linear searching. One drawback of linear searching is its speed. The approach described herein significantly improves the speed of linear searching by allowing multiple entries to be processed simultaneously. For example, with a 6-bit index to the linear memory space, there could be a total of 256 entries (i.e., 6×64). This would effectively allow classification of 320 traffic flows and possibly more with re-hashing. Under the best re-hashing results, 1280 traffic flows (i.e., 1024+256) could be classified. For computing devices that need to classify even more traffic flows, more memory space could be dynamically allocated using expansion buffers. As discussed above with reference to FIG. 3, the "L field" could be used to indicate whether there is a link pointer in the record that points to some other storage space (e.g., an expansion buffer).

Normally, the n-tuple input is roughly 13B in length (e.g., 4B for IP destination address, 4B for IP source address, 2B for destination port, 2B for source port, and 1B for TOS value). As such, 24-bit CRC provides good cryptographic quality to uniquely identify all practical traffic flows. Said another way, it would be nearly impossible for two traffic flows to have the same CRC-derived hash code. Moreover, the rate of classification errors should be very low. For a 24-bit CRC-derived hash code, for example, the chance of a classification error may be less than $2^{-24}$ or roughly $10^{-8}$. The term "classification error" refers to a situation where a traffic flow is erroneously classified, for example, because the classification engine returns an incorrect identifier.

Another approach is to employ a tabulation hash function. For the hash code that is generated for each data packet, some number of collisions can be tolerated, especially if the classification engine is configured to re-hash data packets to resolve collisions. Simpler, faster hash functions, such as tabulation hash functions, can be used in these situations. Accordingly, a tabulation hash function may be employed when the classification engine is configured to re-hash data packets to resolve collisions. A tabulation hash function uses each byte in a concatenated vector to index into an array of random numbers of the size of the directed hash code, performing "XO" operations as follows:

$$h(x) = T[0][x_0] \oplus T[1][x_i] \oplus T[2][x_2] \oplus$$  Eq. 1 where x represents the concatenated tuples of the n-tuple input such that $x_i$ is the i-th byte of "x." Said another way, the subscript indicates the byte position in "x." $T[0][x_0]$ is an array of random number having a bit width that is equal to the desired hash code to be produced as output. The value of the element T is indicated by the byte position and byte value. For example, $T[0][x_0]$ represents the random number at $0^{th}$ row and $x_0$ column.

Tabulation hash functions are relatively easy to calculate. One cycle is normally sufficient for adequate hardware. As such, tabulation hashing can be done very quickly. This is the biggest advantage of tabulation hashing. Since tabulation hashing can be completed in a single cycle, it allows for repeated re-hashing operations—if necessary—to effectively eliminate collisions with minimal use of additional memory space.

Methodologies for Classification and Resolution

Figure 5:
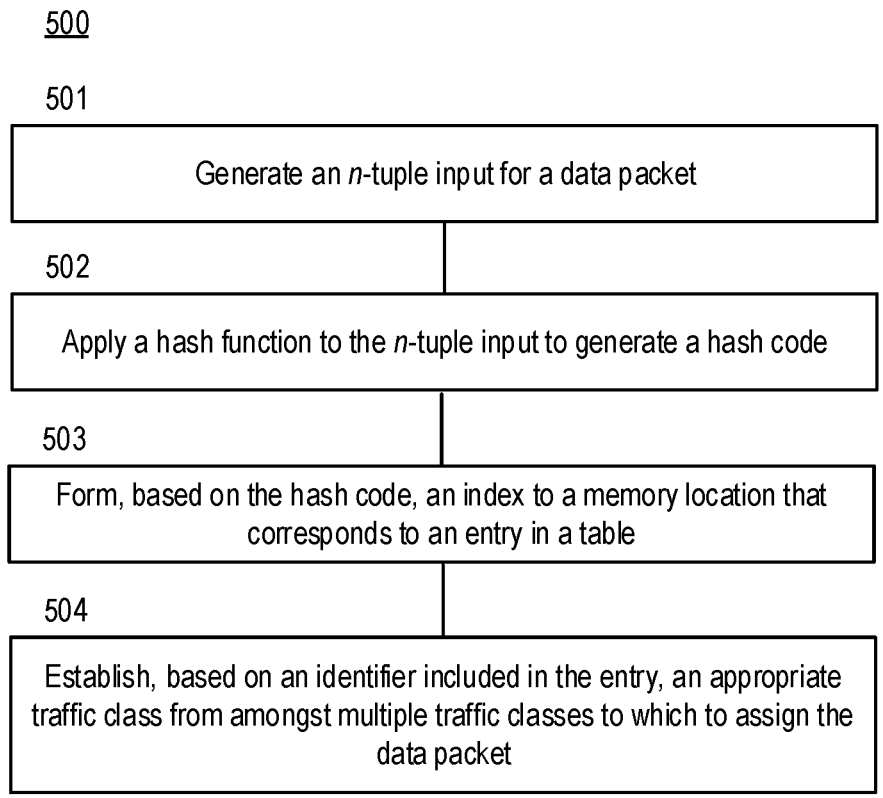
FIG. 5 depicts a flow diagram of a process for classifying data packets using a table that associates hash codes with classification information.

FIG. 5 depicts a flow diagram of a process 500 for classifying data packets using a table that associates hash codes with classification information. While the process 500 is described in the context of identifiers, those skilled in the art will recognize that the table could store other types of classification information.

Initially, a classification engine will obtain a data packet. As discussed above, the data packet may be included in a traffic flow directed to the computing device of which the classification engine is a part. Then, the classification engine can generate an n-tuple input for the data packet (step 501). This may be accomplished by determining, extracting, or otherwise obtaining n pieces of information related to the data packet and then forming a concatenated vector with the n pieces of information. Generally, the n pieces of information are determined based on analysis of the header of each data packet, though the parameters could be determined based on analysis of the payload, trailer, or other information (e.g., accompanying metadata).

Thereafter, the classification engine can apply a hash function to the n-tuple input to generate a hash code (step 502). In some embodiments the hash function is a CRC, while in other embodiments the hash function is a tabulation hash function. Other hash functions could also be employed. The classification engine can then form, based on the hash code, an index to a memory location that corresponds to an entry in a table (step 503). As discussed above, the table may include a series of entries, each of which associates a given hash code with a given identifier. For example, each entry may associate a hash code with a QFI that uniquely identifies a traffic flow of which the corresponding data packet is a part (and that is to be assigned to a particular traffic class).

The classification engine may establish, based on an identifier included in the entry, an appropriate traffic class from amongst multiple traffic classes to which to assign the data packet (step 504). Assume, for example, that the entry specifies a given identifier (e.g., $QFI_1$). In such a situation, the classification engine may understand that the data packet is to be sorted into a queue that is associated with the given identifier and then processed accordingly. Note that, in some embodiments, the identifier is associated with the data packet before being sorted into the queue. For example, the classification engine may append the identifier to the data packet in the form of metadata.

Figure 6:
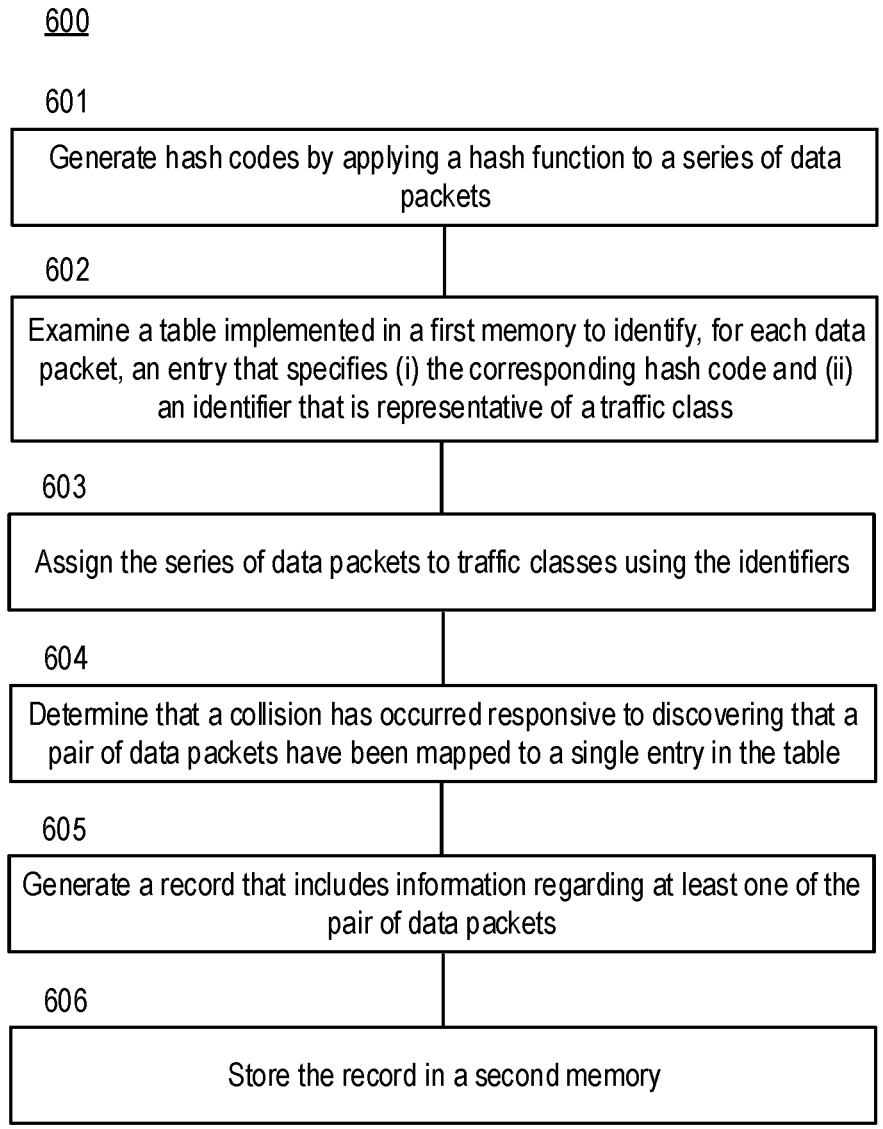
FIG. 6 depicts a flow diagram of a process for classifying data packets included in traffic flows directed to a computing device and then, if necessary, resolving collisions that occur during classification.

FIG. 6 depicts a flow diagram of a process 600 for classifying data packets included in traffic flows directed to a computing device and then, if necessary, resolving collisions that occur during classification. As discussed above, a classification engine can be implemented on a computing device to which one or more traffic flows are directed. Each of these traffic flows is comprised of data packets that must be examined for classification purposes.

Initially, the classification engine can generate hash codes by applying a hash function to a series of data packets (step 601). Note that the series of data packets could be included in a single traffic flow or multiple traffic flows. Then, the classification engine can examine a table implemented in a first memory to identify, for each data packet, an entry that specifies (i) the corresponding hash code and (ii) an identifier that is representative of a traffic class (step 602). The first memory may be, for example, an SRAM located on an integrated circuit. Using these identifiers, the classification engine can assign the series of data packets to traffic classes (step 603). As discussed above, data packets included in the same traffic flow will generally be sorted into the same traffic class.

In some embodiments, the classification engine may determine that a collision has occurred responsive to discovering that a pair of data packets have been mapped to a single entry in the table (step 604). More specifically, the classification engine may determine that a collision has occurred responsive to discovering that a pair of n-tuple inputs generated for a pair of data packets have been mapped to a single entry in the table. To address the resolution, the classification engine may reapply the hash function to the conflicting data packet as discussed above. Additionally or alternatively, the classification engine may search a linear record of past collisions to determine whether an identical collision already occurred.

Moreover, to avoid future collisions, the classification engine may generate a record that includes information regarding at least one of the pair of data packets (step 605). For example, the classification engine may populate the record with the hash code and identifier for whichever of the pair of data packets was processed second by the classification engine. The classification engine can store this record in a second memory (step 606). The second memory may be, for example, another SRAM located on the same integrated circuit as the SRAM that includes the table.

The steps of these processes may be performed in various combinations and sequences. For example, steps 501 and 503 of FIG. 6 could be included in process 600 of FIG. 6. Other steps may also be included in some embodiments.

Overview of Classification Engine

Figure 7:
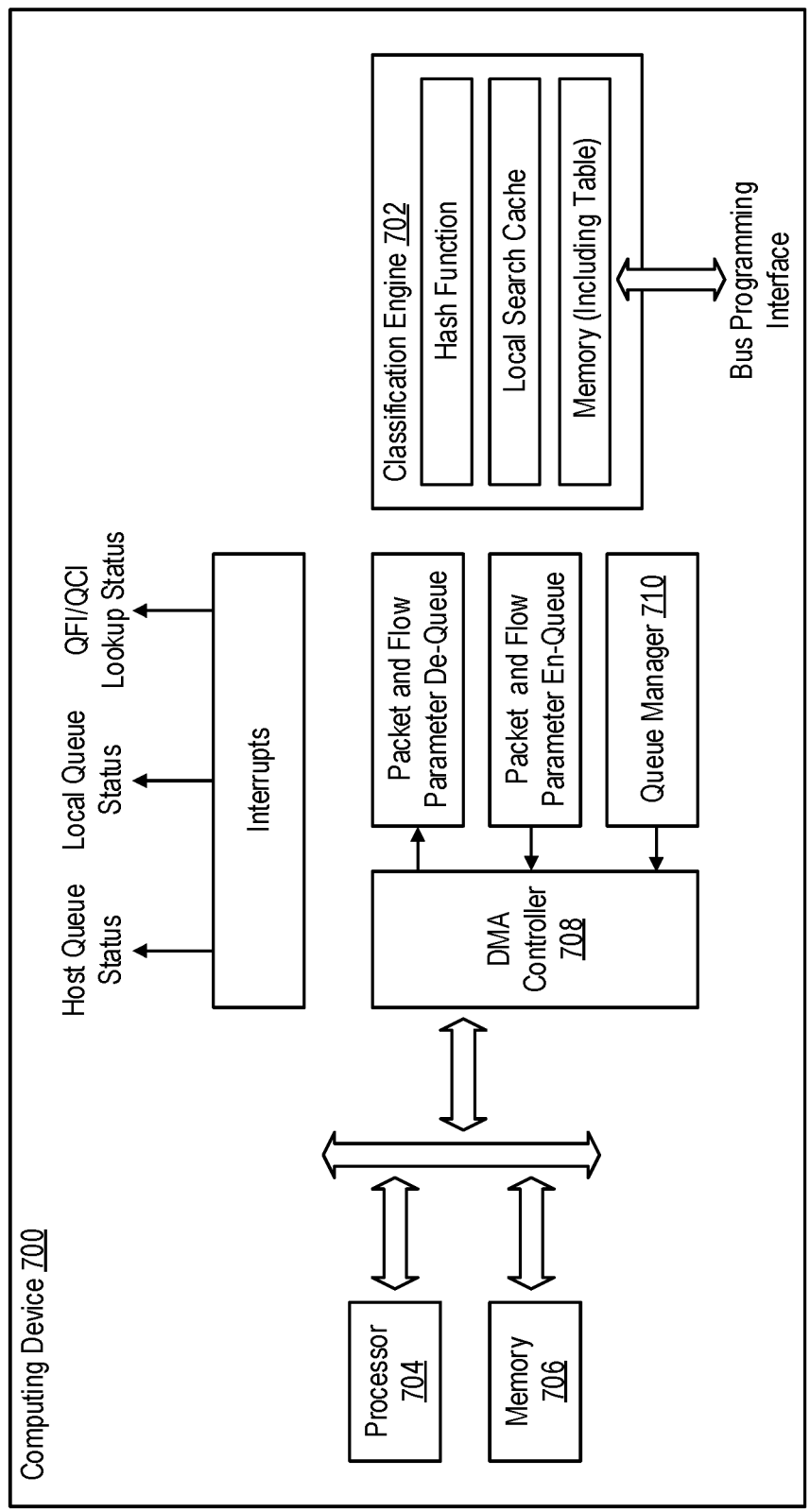
FIG. 7 includes a high-level block diagram of a classification engine that is implemented on a computing device.

FIG. 7 includes a high-level block diagram of a classification engine 702 that is implemented on a computing device 700. As discussed above, the classification engine 702 may be responsible for classifying data packets included in incoming traffic flows in accordance with QoS classifications so as to enable targeted provisioning of network services. In this embodiment, the processor 704 (also referred to as a "central processing unit") is used to configure the design and then program the memory of the classification engine 702 with a table. As discussed above with reference to FIG. 2, the table can uniquely map n-tuple inputs to information useful for classification. For example, each entry in the table may define an association between a hash code generated for a given n-tuple input and an identifier that can be used for classification purposes. Meanwhile, the main system memory 706 may store packet descriptors (also referred to as "packet parameters") or flow descriptors (also referred to as "flow parameters"). As mentioned above, n-tuple inputs can be generated, derived, or established based on these packet and flow parameters. The main system memory 706 may also store the queues to which data packets are assigned following classification. The main system memory 706 may be for example, random-access memory (RAM).

A direct memory access (DMA) controller 708 can be used to access the main system memory 706 to fetch packet and flow parameters to be classified, or the DMA controller 708 can be used to access the main system memory 706 to push classified packet and flow parameters into the main system memory 706. DMA allows the main system memory 706 to be accessed by the controller 708 independent of the processor 704.

Classified packet and flow parameters can be queued into the main system memory 706 based on the classifications as determined by the classification engine 702. When an appropriate classification for a data packet cannot be found in the table stored in the memory of the classification engine 702, the processor 704 can be notified through interrupts as shown in FIG. 7. Upon receiving a notification via an interrupt, the processor 704 can run a QoS algorithm that is defined in accordance with a standard developed by a standards organization (e.g., the 3rd Generation Partnership Project) and then program the table with a valid mapping for the data packet. The table may be built up naturally over time as the processor 704 is notified with interrupts. Each time that an unclassifiable data packet is encountered, the processor 704 may be notified. Then, the processor 704 can process the unclassifiable data packet to define an appropriate mapping to classification information and populate the table accordingly. Subsequent data packets corresponding to the same n-tuple input (e.g., included in the same traffic flow) can then be automatically processed by the classification engine 702 using the newly populated entry in the table. The queue manager 710 may be responsible for managing/controlling the queues into which the data packets are populated following classification, as well as establishing the status of those queues.

Computing System

Figure 8:
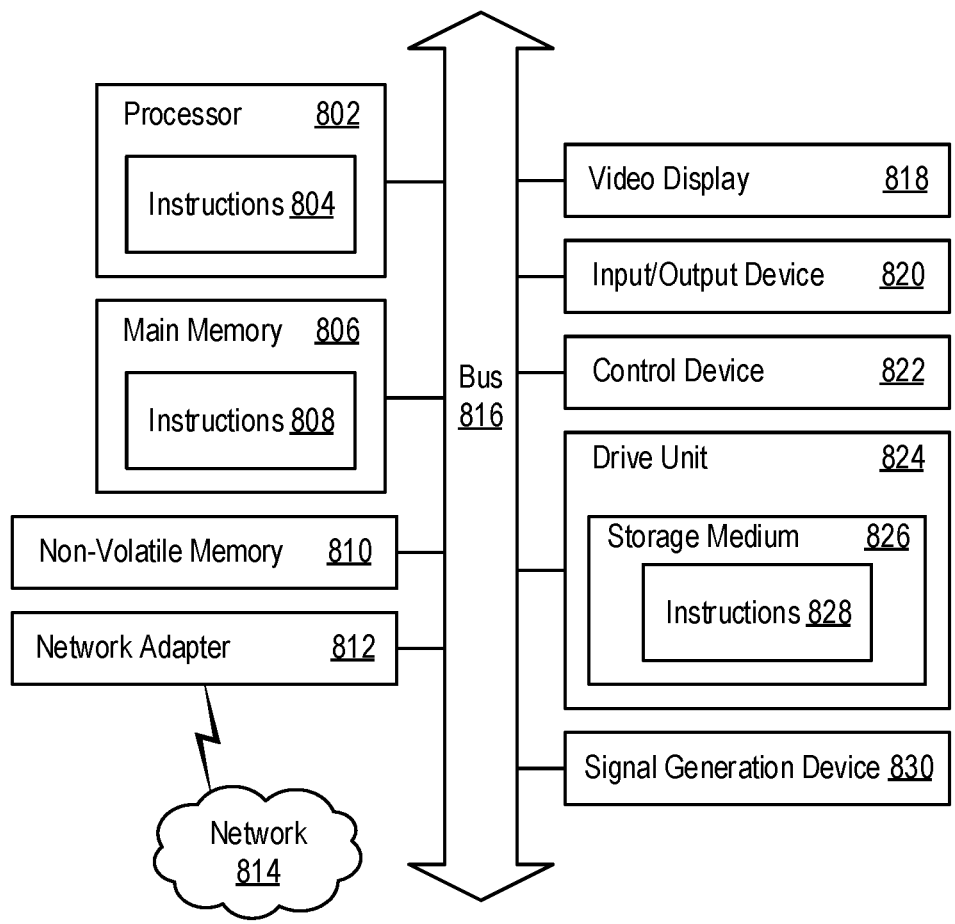
FIG. 8 includes a high-level block diagram that illustrates an example of a computing system in which at least some operations described herein can be implemented.

FIG. 8 includes a high-level block diagram that illustrates an example of a computing system 800 in which a queue manager can be implemented. Thus, components of the computing system 800 may be hosted on a computing device (e.g., computing device 700 of FIG. 7) that includes a classification engine (e.g., classification engine 702 of FIG. 7).

The computing system 800 may include a processor 802, main memory 806, non-volatile memory 810, network adapter 812 (e.g., a network interface), video display 818, input/output device 820, control device 822 (e.g., a keyboard, pointing device, or mechanical input such as a button), drive unit 824 that includes a storage medium 826, and signal generation device 830 that are communicatively connected to a bus 816. The bus 816 is illustrated as an abstraction that represents one or more physical buses and/or point-to-point connections that are connected by appropriate bridges, adapters, or controllers. The bus 816, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit (I2C) bus, or bus compliant with Institute of Electrical and Electronics Engineers (IEEE) Standard 1394.

The computing system 800 may share a similar computer processor architecture as that of a server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 800.

While the main memory 806, non-volatile memory 810, and storage medium 824 are shown to be a single medium, the terms "storage medium" and "machine-readable medium" should be taken to include a single medium or multiple media that stores one or more sets of instructions 826. The terms "storage medium" and "machine-readable medium" should also be taken to include any medium that is capable of storing, encoding, or carrying a set of instructions for execution by the processing system 800.

In general, the routines executed to implement the embodiments of the present disclosure may be implemented as part of an operating system or a specific application, component, program, object, module, or sequence of instructions (collectively referred to as "computer programs"). The computer programs typically comprise one or more instructions (e.g., instructions 804, 808, 828) set at various times in various memories and storage devices in a computing device. When read and executed by the processor 802, the instructions cause the computing system 800 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile and non-volatile memory devices 810, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

The network adapter 812 enables the computing system 800 to mediate data in a network 814 with an entity that is external to the computing system 800 through any communication protocol supported by the computing system 800 and the external entity. The network adapter 812 can include a network adaptor card, a wireless network interface card, a switch, a protocol converter, a gateway, a bridge, a hub, a receiver, a repeater, or a transceiver that includes an integrated circuit (e.g., enabling communication over Bluetooth® or Wi-Fi®).

The techniques introduced here can be implemented using software, firmware, hardware, or a combination of such forms. For example, aspects of the present disclosure may be implemented using special-purpose hardwired (i.e., non-programmable) circuitry in the form of application-specific integrated circuits (ASICs), programmable logic devices (PLDs), field-programmable gate arrays (FPGAs), and the like.

Remarks

The foregoing description of various embodiments has been provided for the purposes of illustration. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes various embodiments, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:
generating an n-tuple input by extracting n pieces of information from a header of a data packet,
wherein the n-tuple input is representative of a concatenated vector that includes the n pieces of information, n being greater than one;
applying a hash function to the n-tuple input to generate a hash code;
forming, based on the hash code, an index to a memory location that corresponds to an entry in a table, wherein the table is implemented in a first memory,
wherein the table includes a series of entries, each of which associates a given hash code with a given identifier; and
establishing, based on an identifier included in the entry, an appropriate traffic class from amongst multiple traffic classes to which to assign the data packet;
wherein the method further comprises:
determining, by a classification engine, that a collision has occurred responsive to discovering that a pair of data packets have been mapped to a single entry in the table;
generating, by the classification engine in response to said determining, a record that includes information regarding at least one of the pair of data packets; and
storing, by the classification engine, the record in a second memory.

2. The method of claim 1, further comprising:
sorting the data packet into a queue that is associated with the appropriate traffic class.

3. The method of claim 1, further comprising:
appending the identifier to the data packet in the form of metadata.

4. The method of claim 1, wherein the table is implemented in static random-access memory (SRAM).

5. The method of claim 1, wherein the n pieces of information specify an Internet Protocol (IP) source address, an IP destination address, a source port, a destination port, a protocol type, a class of service, or any combination thereof.

6. The method of claim 1, wherein the hash function is a cyclic redundancy check (CRC).

7. The method of claim 1, wherein the hash function is a tabulation hash function.

8. The method of claim 1, wherein the identifier is a quality of service (QoS) flow identifier (QFI) that uniquely identifies a traffic flow of which the data packet is a part and that is to be assigned to the appropriate traffic class.

9. A method comprising:
generating, by a classification engine, hash codes by applying a hash function to data packets obtained by a computing device of which the classification engine is a part;
examining, by the classification engine, a table implemented in a first memory to identify, for each data packet, an entry that specifies (i) the corresponding hash code and (ii) an identifier that is representative of a traffic class; and
assigning, by the classification engine, the data packets to multiple traffic classes based on the corresponding identifiers;
wherein the method further comprises:
determining, by the classification engine, that a collision has occurred responsive to discovering that a pair of data packets have been mapped to a single entry in the table;
generating, by the classification engine in response to said determining, a record that includes information regarding at least one of the pair of data packets; and
storing, by the classification engine, the record in a second memory.

10. The method of claim 9, wherein the record specifies the hash code and the identifier for whichever of the pair of data packets was processed second by the classification engine.

11. The method of claim 9, wherein the first and second memories are different static random-access memories (SRAMs) implemented on a single integrated circuit.

12. The method of claim 9, wherein the record is one of multiple parallel records regarding different collisions that are stored in a linear record.

13. The method of claim 9, further comprising:
deriving, by the classification engine, an n-tuple input for each data packet that comprises n pieces of information,
wherein each hash code is generated by applying the hash function the n-tuple input derived for the corresponding data packet.

14. The method of claim 13, further comprising:
determining, by the classification engine, that a collision has occurred responsive to discovering that a pair of n-tuple inputs have been mapped to a single entry in the table; and
addressing, by the classification engine in response to said determining, the collision by searching a linear record in a second memory.

15. The method of claim 14, wherein the linear record includes multiple records of past collisions that are simultaneously allocated for searching by the classification engine.

16. The method of claim 9, wherein the data packets are included in multiple traffic flows directed to the computing device.

17. A system comprising:
a processor;
a main memory that stores at least two parameters of a data packet; and
a classification engine that includes—
(i) a secondary memory programmed by the processor with a table that associates combinations of parameters with classification information, and
(ii) a register in which a cache of results of searches of the table is maintained, wherein the classification engine is configured to:
access the cache to determine whether a result of a search involving the at least two parameters is available,
retrieve the result from the cache responsive to a determination that the result is available, and
classify the data packet based on the result;
wherein the classification engine is further configured to:
determine a collision has occurred responsive to discovering that a pair of data packets have been mapped to a single entry in the table;
generate, in response to said determining, a record that includes information regarding at least one of the pair of data packets; and
store the record in the secondary memory.

18. The system of claim 17, further comprising:
a direct memory access (DMA) controller configured to
(i) fetch the at least two parameters from the main memory prior to classification by the classification engine, and
(ii) push the at least two parameters to the main memory for storage following classification by the classification engine.

19. The system of claim 17, wherein the secondary memory is a static random-access memory (SRAM) implemented on a same integrated circuit as the register.

* * * * *